United States Patent [19]
Kenny

[11] 4,233,957
[45] Nov. 18, 1980

[54] SOLAR ENERGY COLLECTOR

[75] Inventor: Neal S. Kenny, Elmira, N.Y.

[73] Assignee: Corning Glass Works, Corning, N.Y.

[21] Appl. No.: 878,226

[22] Filed: Feb. 16, 1978

[51] Int. Cl.² .............................................. F24V 3/02
[52] U.S. Cl. .................................................... 126/443
[58] Field of Search .................. 427/106; 126/271, 270

[56] References Cited
U.S. PATENT DOCUMENTS

| | | | |
|---|---|---|---|
| 2,522,531 | 9/1950 | Mochel | 427/109 |
| 4,092,444 | 5/1978 | Kilichowski | 427/106 |
| 4,094,299 | 6/1978 | Voelker | 126/270 |
| 4,116,225 | 6/1978 | Ortabasi | 126/270 |

Primary Examiner—Albert W. Davis
Attorney, Agent, or Firm—John P. DeLuca; Burton R. Turner

[57] ABSTRACT

An evacuated solar collector receives impinging solar radiation of varying intensity and converts the same into useful thermal energy in a selected working range of the ambience. The collector has absorber and window surfaces selectively coated for rendering the conversion of solar radiation to useful thermal energy more efficient by increasing absorption, reducing reradiation, and in certain cases may include at least one electrically conductive coating on the solar window which is capable of carrying an electric current, for suppressing snow accumulation thereon.

7 Claims, 2 Drawing Figures

SOLAR ENERGY COLLECTOR

BACKGROUND OF THE INVENTION

In a solar collector of the evacuated tubular type, of which there are many examples, the goal of increasing the efficiency of the collector, even by as a small a degree as a fraction of a percent, is now recognized as important in the state of the art.

The evacuated tubular solar collector poses one of the best possibilities for very high solar efficiency, mainly because the absorber is isolated from ambience by an evacuated jacket or envelope which utilizes a relatively high quality vacuum as an insulating space. Some models of collectors provide for a double wall, concentric tube, vacuum bottle arrangement with the outer tube being a solar window and the inner tube functioning as an absorber, whereas other arrangements utilize a single wall tubular member for a window or envelope with a flat plate or heat pipe absorber surrounded thereby in an evacuated space. Still others diverge from the tubular concept, and provide a flat window, evacuated on one side, with a honeycomb support structure for supporting the window against the atmospheric pressure exerted against the vacuum side. Even still another type uses evacuated tubes for a window in a flat plate arrangement. This latter type may be fabricated with an insulating structure of evacuated tubes or a foam insulating support structure for an absorber.

The aforementioned arrangements are but some of many possible examples available in the art. However, it should be realized that, as previously mentioned, the suppression of thermal losses like convection, conduction, and radiation significantly increases the efficiency of the evacuated collector structures. For example it is known that selective absorbers increase adsorption and reduce emission of energy by reradiation from the absorber surface. Absorptivity $\alpha$ characteristics of at least as high as 0.9 have been produced, and emissivity characteristics $\epsilon$ of as low as 0.1 have been achieved. At various stages of development, production cost versus effectiveness of the selective absorber surface so produced is an important factor which most usually determines its ultimate application. Thus a low cost highly effective selective coating for an absorber is envisioned by the present invention.

Another method of reducing loss from the collector, having a selective absorber surface is to coat the collector window to further suppress the emissivity losses from the absorber.

It should be noted that absorbtivity $\alpha$ and emmissivity $\epsilon$ are measured in different wavelength regions. Visible and near visible solar radiation from about 0.2 to about 2.0 micrometers is the proper domain for evaluating absorber performance in terms of adsorptivity $\alpha$, whereas the infrared and near infrared domain of about 2.0 to about 20 micrometers is the characteristic region for measuring the effectiveness of the absorber emissivity $\epsilon$. It is known that certain coatings or films are transparent to solar radiation and opaque to infrared energy and vice versa. Thus it is possible to produce an energy trap. As low as losses are, however, there is room for improvement in terms of cost versus efficiency, since small improvements in the reduction of emissivity or increases in absorptivity usually are expensive and may not be cost effective.

It is to this end of providing a more efficient solar collector which is cost effective that the present disclosure is directed.

It has been found also that the possibility of solar system shutdown can occur even though there is available a high solar flux, if the collector is covered with snow. The present invention uses thermal and electrical properties of certain coatings to further increase the effectiveness of such collectors by reducing the possibility of such shutdowns by an effective snow removal element which thereby increases the energy collection time of the absorber.

Preferred coatings, hereinafter described, may be formulated and applied to a substrate in accordance with the principles set forth and described in U.S. Pat. No. 2,564,706 to Mochel, and in a patent application of E. M. Griest filed the same date of the present invention, both references being assigned to Corning Glass Works the assignee herein.

SUMMARY OF INVENTION

There has been provided a solar collector of the type wherein an absorber surface is substantially isolated from ambience by an evacuated enclosure and the absorber is coated with selective materials having a relatively high absorbtivity $\alpha$ of about 0.8 in a wavelength for impinging solar radiation and a relatively low emissivity characteristic $\epsilon$ of about 0.3 in an infrared wavelength range. In one embodiment, an absorber structure is coated with composite coatings of various types; a first coating having a relatively high absorptivity is desposited on one surface of the absorber structure and may be in direct contact with working fluid in heat exchange relation therewith, and a second coating is deposited on a surface of said absorber, spaced away from said working fluid which second coating exhibits a relatively low emissivity. In another embodiment a window for the collector is coated with a low emissivity electrically conductive coating to suppress emissions from the absorber and which window coating may be electrified by attached electrical leads.

DESCRIPTION OF THE PREFERRED EMBODIMENTS

Figure 1:
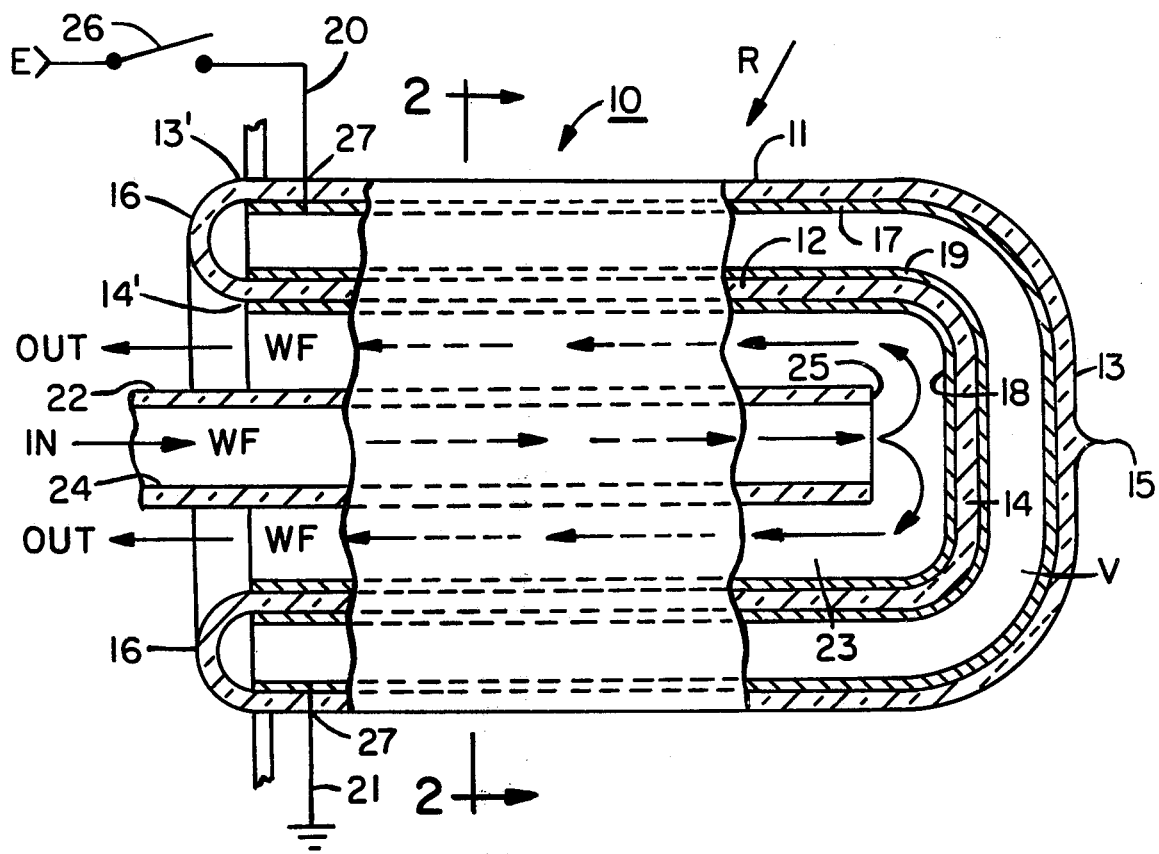
FIG. 1 is a fragmental side cross sectional elevation of an evacuated tubular solar collector of the evacuated vacuum bottle type with wall and coating thicknesses exaggerated.

In FIG. 1 there is illustrated a collector 10 of the evacuated vacuum bottle type which includes, an outer tubular member or tube 11 forming a window for the collector 10 and an inner tubular member or tube 12 disposed therein forming an absorber surface for the collector 10. Outer tubular member 11 and inner tubular member 12 each have respective closed ends 13 and 14. Outer tubular member 11 has another closed end 13' which closure is formed by the joining of the inner and outer tubes 11 and 12 respectively along an annular seal 16. The outer tubular member 11 also has a tipoff point 15 which is used to withdraw atmosphere from an evacuated annular space V between the respective outer and inner tubular members 11 and 12. Once the space V is evacuated the tipoff point 15 is closed by some appropriate means as for example a lampworker's torch.

A fluid delivery tube is inserted in open end 14' of inner tubular member 12. Working fluid WF may be injected into inlet end 24 of delivery tube 22 flowing therealong to an outlet 25 near closed end 14 of inner tubular member 12. Thereafter working fluid WF circulates through an annular space 23 between the delivery tube 22 and inner tubular member 12 to an outlet therefor formed by opening 14'. The working fluid WF is in heat exchange relation with the inner tubular member 12 and withdraws sensible heat produced by solar insolation thereon. Such a collector 10 is considered to have a reasonably high efficiency since conduction and convection losses therefrom are minimized by the presence of the evacuated space V.

An absorber surface for the present invention may be comprised of a composite coating deposited on the inner tubular member 12 including, an absorber coating 18 and an emittance reducing coating 19. The aforementioned coatings are deposited on respective inner and outer surfaces of inner tubular member 12, sometimes hereinafter referred to as absorber substrate 12.

Solar radiation R passes through a substantially transparent glass window 11 and impinges on the inner tubular member 12. The solar radiation R passes through the emittance reducing coating 19, as it is substantially transparent to solar radiation in the wavelength range from about 0.2 to about 2.0 micrometers, and likewise the solar radiation R passes through the absorber substrate 12 (also glass) which is substantially transparent to solar radiation in the aforementioned wavelength range. However the solar radiation R is absorbed by the absorber coating 18 which is substantially opaque to the solar radiation and has a high absorptivity $\alpha$ in the order of 0.8 or better in the aforementioned solar radiation wavelength range considered herein.

As with any nonselective black or grey body the absorber coating 18 and absorber substrate 12 may exhibit a significantly high emissivity $\epsilon$ of about 0.9 in a wavelength range in the infrared from about 2.0 to about 20 millimicrons. Energy emitted by radiation from the absorber coating 18 and absorber substrate 12 must be suppressed or the efficiency of the collector 10 will be significantly reduced. In certain situations the absorber coating 18 itself could possibly be of the selective absorber type, however in the present invention, the selectivity is accomplished by use of the emittance reducing coating 19. The coating 19 is located on an outer surface of the inner tube 12, thus trapping the infrared radiation inwardly of the inner tubular member 18 such that the working fluid WF may, by heat exchange, remove the sensible heat produced by insolation. The composite coating on the inner tube 12, including the absorber coating 18 and emittance reducing coating 19, forms an energy trap for impinging solar radiation.

The type of materials used for the respective absorber and reducing coatings 18 and 19 are preferably tin oxide films each having a certain percent of antimony doping. Examples of electrically conductive films which may be effectively utilized as solar absorber and enhancing films, or coatings are disclosed in Mochel, U.S. Pat. No. 2,564,706, issued Aug. 21, 1946 now expired, and Griest, Ser. No. 878,225, now abandoned, filed the same date as this present disclosure.

The absorber coating 18 may be formulated from oxides of tin and antimony as described in Mochel and Griest having an antimony doping of about 10% antimony by weight. The reducing coating 19 may also be a formulation similar to the absorber coating 18 but having a low antimony doping, of about 1% by weight. The high antimony doping for the absorber coating 18 renders the coating substantially opaque to solar radiation and therefore a good absorber. On the other hand, low antimony doped tin oxide exhibits a relatively low emissivity in the infrared range and has a relatively good transparency to solar radiation, such that, the reducing coating 19 deposited on the absorber substrate tends to suppress the infrared emission from the inner tube 12 but permits the transmission of a substantial portion of the available solar radiation therethrough.

It should be realized that there are transmission losses for each medium the radiation R must encounter due to reflection and absorption. However, it will be assumed for purposes of this discussion that such losses are offset by the higher cost effectiveness of the present system and overall increased efficiency obtained by the respective high absorptivity and low emissivity coatings 18 and 19.

It should be pointed out that in a preferred embodiment the absorber coating 18 may be in contact with the working fluid WF. This direct contact with the absorber coating deposited on the inside surface of the inner tubular member enhances the heat transfer rate and thermal response of the collector 10.

Figure 2:
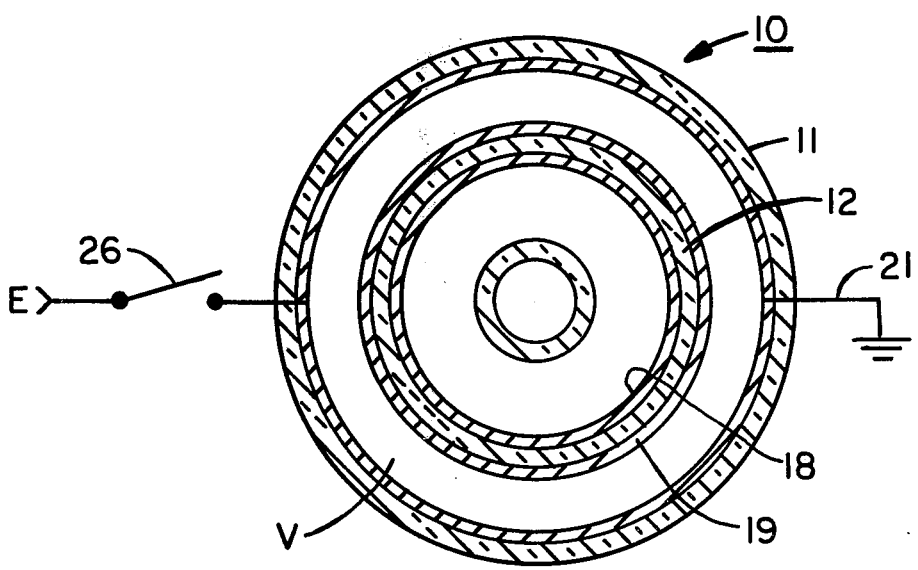
FIG. 2 is an axial cross sectional view of the collector employing embodiments of the present invention taken in a direction 2—2 of FIG. 1.

In another embodiment of the present invention illustrated for convenience in the same FIGS. 1 and 2, window coating 17 may be deposited as shown on the interior surface of the outer tubular member 11. The window coating 17 may be of substantially the same composition as the emittance reducing coating 19 for suppressing emissions to the ambient.

It is known that tin oxide is a good electrical conductor and electrically conducting films have been deposited on glass in the past for various purposes including infrared shielding. In the present invention the electrically conductive film 17 may form part of a circuit from a source of electrical energy E, switch 26 to lead 20 through the electrically conducting window coating 17 to the output lead 21 and to ground G. If snow or ice is deposited on the external surface of the outer tubular member 11 an electrical current can be passed through the window coating 17 to melt the ice or snow and thus reduce the possibility of lower efficiency of the collector 10 due to shading of the absorber coating 18. It should be understood that the window coating 17 may be placed either interior or exterior of the outer tube 11. If placed interior of the tube 11 as shown the low emissivity characteristic $\epsilon$ of the window coating 17 operates in a more efficient manner to suppress radiation losses since it reduces heat transferred to the outer tubular member 11. However, by placing the window coating 17 interior of the outer tubular member 11, glass-to-metal seals 27 must be fabricated to couple the connectors 20 and 21 through the glass walls of tube 11 to the film 17. On the other hand if the film is exterior of the tube 11 the electrical connections 20 and 21 are more easily established, and in addition the window coating 17 provides very good abrasion resistance for the glass surface of the outer tubular member 11. It is possible also to coat both sides of the outer tubular member 11 by dipping or spraying it with a proper solution of coating material.

The present invention is not limited to the vacuum bottle type solar collector illustrated, but may be simply accomplished by the use of a tubular member having a flat plate absorber surface disposed therein connected to a source of working fluid through a U-tube or counter flow tube attached thereto, which U-tube etc. is passed through a tubular glass wall and sealed with a glass-to-metal or glass to glass seal. The tubular member may be evacuated to provide the same convection and conduction suppression mechanism as illustrated in the FIGS. 1 and 2. In such an arrangement the interior or exterior surfaces of the tubular member could be coated and the absorber coatings 18 and 19 to reduce emissions, e.g. herein, might be deposited on the flat plate in accordance with the aforementioned description as long as reducing coating 19 is disposed between the absorbing coating 18 and the source of impinging radiation R.

One advantage of the use of tin oxide films described herein for deposition on tubular members 11 and 12 is that the tin oxide coatings might be easily deposited on the draw. That is, when the tubular members are drawn from a tube forming furnace at a substantially elevated temperature tin compound solutions might be sprayed on the hot tubing and form a thin coating. Coating the tubing on the draw might lower the cost of the collector, and thereby improve its cost-effectiveness, since the expense of reheating the tubing to the coating temperature is avoided. Furthermore the location of the absorber coating 18 outer inner surface of tubular member 12 and the location of the reducing coating 19 on the outer surface of the same tubular member, allows the coatings to be simultaneously deposited on the draw, thereby effecting a further improvement in cost-effectiveness of the collector 10. Furthermore antimony constituents might be added to the aforementioned spray compound to vary the concentration thereof for establishing the desired characteristics for the various coatings.

While there has been described what are considered to be the preferred embodiments of the present invention, it will be obvious to those skilled in the art that various changes and modifications may be made therein without departing from the invention, and it is intended in the appended claims to cover all such changes and modifications as fall within the true spirit and scope of the invention.

What is claimed is:

1. A solar energy collector operative to produce thermal energy under impinging solar radiation wherein, an absorber substrate in the form of a tubular member is disposed in spaced relation within a solar window in the form of an outer tubular member, a space between said inner and outer tubular members being evacuated to a selected partial pressure, means for introducing working fluid within the inner tubular member in heat exchange relation with the absorber substrate via an open end of said inner tubular member wherein the improvement comprises: composite coatings disposed on selected surfaces of said absorber substrate and solar window including: an absorber coating of selected absorber material having a relatively high absorptivity characteristic $\alpha$ of at least 0.8, to solar radiation within the wavelength range of about 0.2 micrometers to about 2.0 micrometers, and an emittance reducing coating having a relatively low emissivity characteristic $\epsilon$ for infrared radiation within the wavelength range of about 2.0 micrometers to about 20 micrometers deposited on at least one surface of said inner tubular member to surround said absorber coating, said yielding an emissivity characteristic $\epsilon$ for the absorber of at most 0.3 in said infrared range; and an electrically conductive window coating disposed on at least one surface of said outer tubular member, said solar window coating having a relatively low emissivity characteristic $\epsilon$ therefor of at most 0.3 within said aforementioned infrared range, and means operatively coupled to said window coating for conducting an electrical current through said coating for heating said outer tubular member.

2. The collector of claim 1 wherein the coatings consist essentially of antimony doped tin oxides.

3. The collector of claim 1 wherein said absorber coating comprises a first layer of energy absorbing material in said solar wavelength range having an absorptivity of about 0.9 and a second layer disposed over said first layer interposed between the solar radiation and the first layer having an emissivity in the infrared range of about 0.1.

4. The collector of claim 1 wherein the outer tubular member forming the solar window comprises a glass tube being substantially transparent to solar radiation.

5. The collector of claim 1 wherein said second coating surrounds said first coating and said first coating is in direct contact with the working fluid.

6. In a solar energy collector wherein an absorber substrate in the form of an elongated member is disposed in spaced relation behind a solar window, means for introducing working fluid in heat exchange relation with the absorber substrate via an entrance and exit in said housing wherein the improvement comprises: a coating disposed on at least one surface of said window having a relatively low emissivity characteristic $\epsilon$ to infrared radiation within the wavelength range of about 2.0 to about 20 micrometers, wherein said coating is electrically conductive and heatable by electrical energy passing therethrough and means electrically coupled to said coating adapted to deliver electrical energy to said coating for heating said window.

7. The collector of claim 6 wherein said emissivity characteristic of said window coating is at most 0.3 in said infrared range.

* * * * *

UNITED STATES PATENT AND TRADEMARK OFFICE
CERTIFICATE OF CORRECTION

PATENT NO. : 4,233,957

DATED : November 18, 1980

INVENTOR(S) : Neal S. Kenny

It is certified that error appears in the above-identified patent and that said Letters Patent are hereby corrected as shown below:

Column 6, line 12, "said" (second occurrence) should be changed to --and--.

Signed and Sealed this

Seventeenth Day of March 1981

[SEAL]

Attest:

RENE D. TEGTMEYER

Attesting Officer

Acting Commissioner of Patents and Trademarks